US007996411B2

(12) United States Patent
Yaeger

(10) Patent No.: US 7,996,411 B2
(45) Date of Patent: Aug. 9, 2011

(54) METHOD, APPARATUS, AND SYSTEM FOR TRANSLATING SELECTED CHARACTERS IN A RECORD PROCESSING SYSTEM

(75) Inventor: Frank L. Yaeger, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1692 days.

(21) Appl. No.: 10/402,643

(22) Filed: Mar. 28, 2003

(65) Prior Publication Data

US 2004/0193577 A1    Sep. 30, 2004

(51) Int. Cl.
*G06F 7/00* (2006.01)

(52) U.S. Cl. ........ 707/752; 707/602; 707/701; 707/702; 707/753; 707/756; 707/758

(58) Field of Classification Search .................. 720/718; 719/321; 716/1, 18; 717/126; 712/23; 711/203; 709/246, 223, 203; 707/10, 100, 1, 3, 7, 707/104.1, 752–756, 758, 602, 701, 702; 708/200

See application file for complete search history.

(56) References Cited

U.S. PATENT DOCUMENTS

| | | | |
|---|---|---|---|
| 4,873,625 A * | 10/1989 | Archer et al. | 707/7 |
| 5,079,700 A | 1/1992 | Kozoll et al. | 395/700 |
| 5,113,341 A | 5/1992 | Kozol et al. | 364/419 |
| 5,278,987 A | 1/1994 | Chiang et al. | 395/800 |
| 5,309,566 A * | 5/1994 | Larson | 710/70 |
| 5,386,578 A * | 1/1995 | Lin | 712/300 |
| 5,600,825 A | 2/1997 | Atkins et al. | 395/607 |
| 5,610,603 A | 3/1997 | Plambeck | 341/51 |
| 5,675,818 A | 10/1997 | Kennedy | 395/758 |
| 5,784,544 A | 7/1998 | Stevens | 395/112 |
| 5,787,452 A | 7/1998 | McKenna | 707/536 |
| 5,924,092 A | 7/1999 | Johnson | 707/7 |
| 6,021,407 A * | 2/2000 | Meck et al. | 707/7 |
| 6,044,393 A | 3/2000 | Donaldson et al. | 709/100 |
| 6,279,018 B1 | 8/2001 | Kudrolli et al. | 707/540 |

FOREIGN PATENT DOCUMENTS

CA    2205641    11/1998

OTHER PUBLICATIONS

Tauno Ylinen, Assembler Utility Function for APL2/PC, Jul. 1992, K5mnerintie 6 B 19, SF—00750 Helsinki, pp. 1-11.*

(Continued)

*Primary Examiner* — Apu M Mofiz
*Assistant Examiner* — Cindy Nguyen
(74) *Attorney, Agent, or Firm* — Kunzler Needham Massey & Thorpe

(57) ABSTRACT

Control statements related to inputting, sorting, filtering, formatting, and outputting data records in a data processing system are scanned to find one or more formatting options related to character translation. Files comprising a plurality of data records are input, processed, and output as directed by the control statements. As specified by the formatting options, character translation operations are conducted on selected characters. The character translation operations are conducted in conjunction with inputting and outputting the data records. In one embodiment, the supported character translation operations include lowercase to uppercase conversion, uppercase to lowercase conversion, EBCDIC-to-ASCII conversion, ASCII-to-EBCDIC conversion, and user-definable character translation. The present invention increases the utility of a data processing system while minimizing the programming burden associated with translating selected characters while processing data records.

24 Claims, 6 Drawing Sheets

OTHER PUBLICATIONS

"ASCII-Text to EBCDIC-Indexed" copyright 1987-2002, Simotime Enterprises, LLC.*
IBM Storage, Storage Software DRSORT.MVS Release 13 Features, www.storage.ibm.com/software/sort/mvs/release_13.
W. J. Johnson and O. W. Weber, *Method for Recursive Multiple Partition Clipboard With Filter Functions*, IBM Technical Disclosure Bulletin, vol. 37 No. 3, Mar. 1994 pp. 247-248.
J. E. Hunter *Lexicographic Sorting*, IBM Technical Disclosure Bulletin, vol. 23 No. 6, Nov. 1980 pp. 2409.

* cited by examiner

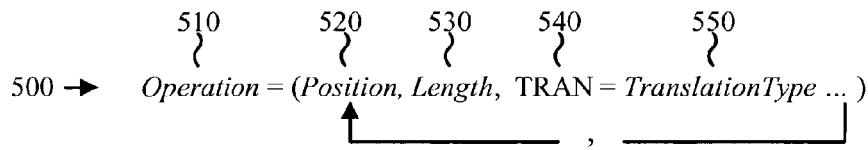

500 → *Operation* = (*Position, Length,* TRAN = *TranslationType* ... )

510 ⌁ *Operation* - Operation Indicator

INREC FIELDS - Input and Reformat Data Records (previous to Sort Stage)
    OUTREC FIELDS - Reformat and Output Data Records (after Sort Stage)
    OUTFIL OUTREC - Reformat and Output Data Records (Supplemental Stage)

520 ⌁ *Position* - Starting Position within Record of Selected Characters

530 ⌁ *Length* (Optional) - Length of Selected Characters

550 ⌁ *TranslationType* - Character Translation Type

LTOU - Translate lowercase characters to uppercase characters
    UTOL - Translate uppercase characters to lowercase characters
    ALTSEQ - Translate characters according to User-defined Translation Table
        Specified by the ALTSEQ Statement

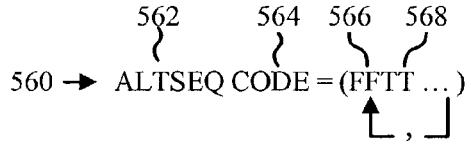

560 → ALTSEQ CODE = (FFTT ... )

Fig. 5

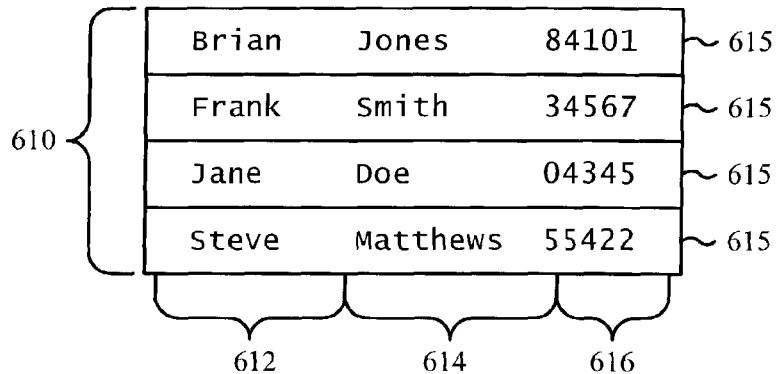
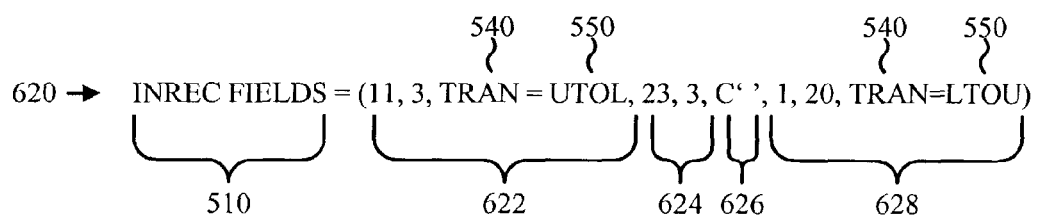
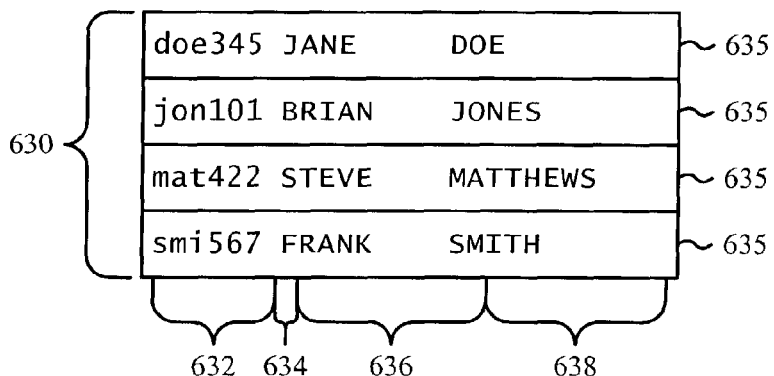
Fig. 6

METHOD, APPARATUS, AND SYSTEM FOR TRANSLATING SELECTED CHARACTERS IN A RECORD PROCESSING SYSTEM

BACKGROUND OF THE INVENTION

1. The Field of the Invention

The invention relates to methods, apparatus, and systems for improved data processing. Specifically, the invention relates to methods and apparatus for translating selected characters within records processed by a data processing system.

2. The Relevant Art

Record sorting is a necessary and useful utility within data processing systems. Sorting facilitates the ordering of data records in a manner useful for processing applications such as searching data records, generating billing statements, creating reports, compiling directories, and the like. The ability to sort data records using one or more selected fields as a sorting key facilitates intelligent processing of data records.

While sorting is a useful operation, sorting data records and conducting operations associated therewith can consume large amounts of computational capacity, particularly when dealing with files containing a large quantity of data records.

Pipelined sorting systems have been developed to meet the performance demands of applications that process large files. Pipelined sorting systems achieve increased performance by partitioning a problem into stages, where each stage focuses processing resources on specific tasks. Typically, data records in the form of files are fed one record at a time into a processing pipeline. As each pipeline stage finishes processing a data record, the data record may be passed onto a subsequent stage for further processing.

Execution flexibility is one advantage of pipelined processing systems. The processing stages that are ready for execution may be distributed to available processors, while processing stages that are blocked may be suspended to provide processing capacity to other stages.

To increase processing efficiency, control statements associated with a set of data records may be parsed and packed into one or more control blocks prior to actual processing. The control blocks configure the various processing stages of a processing pipeline and facilitate efficient execution. Pipeline stages that are not referenced within control statements are preferably bypassed to eliminate unneeded record handling. The ability to control pipeline stages via control statements essentially provides a job-configurable virtual machine useful to developers and users of pipelined applications and utilities.

In addition to sorting, pipelined sorting systems may include features for selectively processing data records as directed by control statements associated with a set of data records. For example, IBM®'s DFSORT™ utility supports control statements corresponding to a skip stage, a user supplied input stage, a filtering stage, a stop stage, a first reformatting stage, a sort, copy, or merge stage, a second reformatting stage, a user supplied output stage, and one or more supplemental stages.

The skip stage skips or discards a selected number of the data records before passing unskipped records onto the rest of the pipeline. The user supplied input stage facilitates customized processing on the unskipped records or data records provided from programmable sources. The filtering stage filters the data records such that selected records are passed on to the remainder of the pipeline, while other records are discarded or redirected.

The stop stage passes a specified number of the data records to the remainder of the pipeline and thereby limits subsequent processing, such as sorting, to a specified number of data records. The first reformatting stage reformats data records and passes the formatted records to the sort, copy or merge stage. The second reformatting stage may also be used to apply additional formatting operations to the data records subsequent to the sort, copy or merge stage.

The user supplied output stage facilitates execution of customized processing on and data output of the processed data records. The supplemental processing stage may be used to conduct specialized formatting and reporting operations in order to generate multiple forms of output related to a set of data records.

The various stages included in the aforementioned sort utility were developed in response to the needs of developers and users. Each pipeline stage executes in an efficient manner and adds to the flexibility and power of the sort utility. The ability to draw upon the power and efficiency of the utility via control statements severely reduces the programming burden associated with creating customized applications such as generating billing statements, publishing directories, creating reports, and the like.

Character translation is a data processing operation that may be frequently conducted within data processing systems—for example when formatting or reformatting data records. The optimum implementation of character translation varies widely with usage. The needed application of character translation may vary from translating all lowercase to uppercase characters within every record of a file to converting specific control characters within a particular data field of selected records. Typically, performing the wide variety of character translations tasks required by data processing systems has required development of a customized utility or exit code. While extremely useful, the task of creating a customized utility or exit code is not desirable, as the process is lengthy and error prone.

What is needed is the ability to specify selected character translation actions through the use of control statements, so that the translation actions can be achieved while conducting other record processing functions such as sorting, merging, and copying data records.

SUMMARY OF THE INVENTION

The methods of the present invention have been developed in response to the present state of the art, and in particular, in response to the problems and needs in the art that have not yet been fully solved by currently available character translation means and methods. Accordingly, the present invention provides an improved method, apparatus, and system for conducting character translation in a record processing system.

In one aspect of the invention, a method for processing data records within a record sorting system includes scanning control statements to find formatting options related to character translation, inputting a plurality of data records, translating selected characters within the plurality of data records as specified by the formatting options, and outputting the plurality of data records. In one embodiment, the selected characters are specified by a field position indicator indicating a starting position of the selected field within a record or a character position and length indicator indicating a starting position and length of the selected characters.

In one embodiment, the method for processing data records supports formatting options related to character translation within input control statements, output control statements, and supplemental control statements. The various control statements may correspond to specific processing stages within a pipelined sorting system. In the aforementioned embodiment, the formatting options may be used to specify lowercase-to-uppercase conversion, uppercase-to-lowercase conversion, and user-definable character translation using a character translation table.

In another aspect of the present invention, an apparatus for processing data records within a record sorting system includes a parser configured to scan control statements and find formatting options relating to character translation, a data I/O module configured to input and output a plurality of data records, and a character translation module configured to translate selected characters within the plurality of data records as specified by the formatting options. The apparatus for processing data records within a record sorting system facilitates translating selected characters within data records in a manner specified by the formatting options related to character translation. The apparatus may also include a sorting module configured to sort the plurality of data records.

In another aspect of the present invention, the syntax of the control statements related to character translation facilitates selecting a specified character translation from a plurality of character translations. The ability to select a specified translation within various control statements increases the usefulness of data processing systems.

The various elements of the present invention are combined into a system for sorting data records. In one embodiment the system for sorting data records includes a mainframe computer configured to execute control statements, and a sort utility configured to input, sort, and output a plurality of data records. The sort utility is also configured to conduct character translation on selected characters within the plurality of data records as specified by formatting options within the control statements. The sort utility may also be configured to copy or merge the plurality of data records. In one embodiment, the character translation conducted by the sort utility may be selected from lowercase-to-uppercase conversion, uppercase-to-lowercase conversion, and user-definable character translation.

The various aspects of the present invention may be used to conduct character translation on selected characters within data records while conducting other data processing functions such as sorting, merging, and copying data records. The present invention increases the utility of a data processing system while minimizing the processing and programming burdens associated with character translation. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a text-based diagram illustrating the syntax of one embodiment of a character translation control statement of the present invention; and FIG. 6 is a text-based diagram illustrating sample translation results for the present invention.

DETAILED DESCRIPTION OF THE INVENTION

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
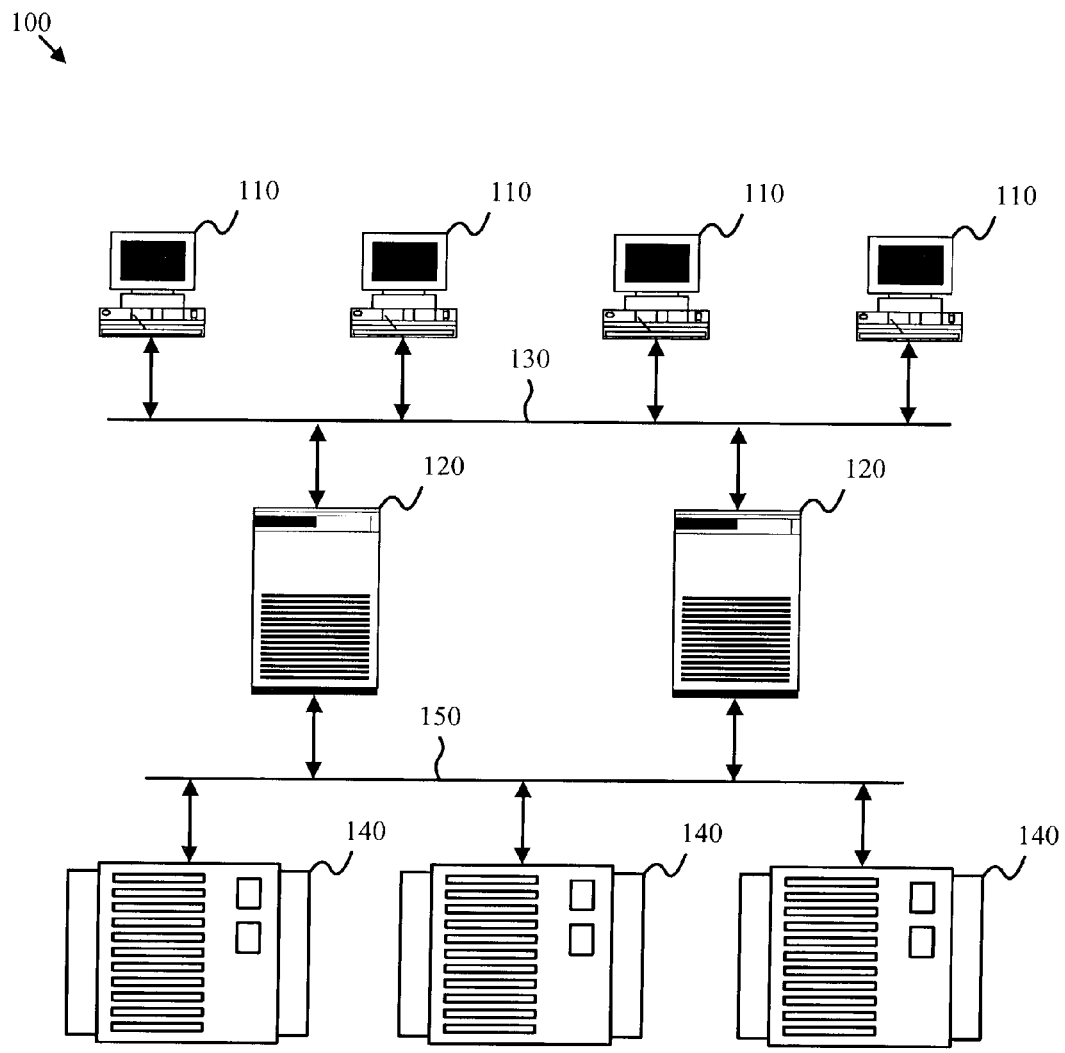
FIG. 1 is a block diagram illustrating a representative data processing system.

Referring to FIG. 1, a data processing system 100 is depicted that is representative of an environment in which the present invention may be deployed. The depicted data processing system 100 includes terminals or workstations 110 interconnected with one or more computers 120 via a network 130. The network 130 may be a local area network and/or a wide area network. Computers 120 may include mainframe computers.

The depicted data processing system 100 also includes one or more storage subsystems 140 interconnected with computers 120 via a storage network 150. The mainframe computers 120 are preferably configured to conduct high bandwidth input and output (I/O) with the storage subsystems 140. The storage subsystems 140 may include redundant components such as storage controllers and storage devices in order to increase reliability.

Figure 2:
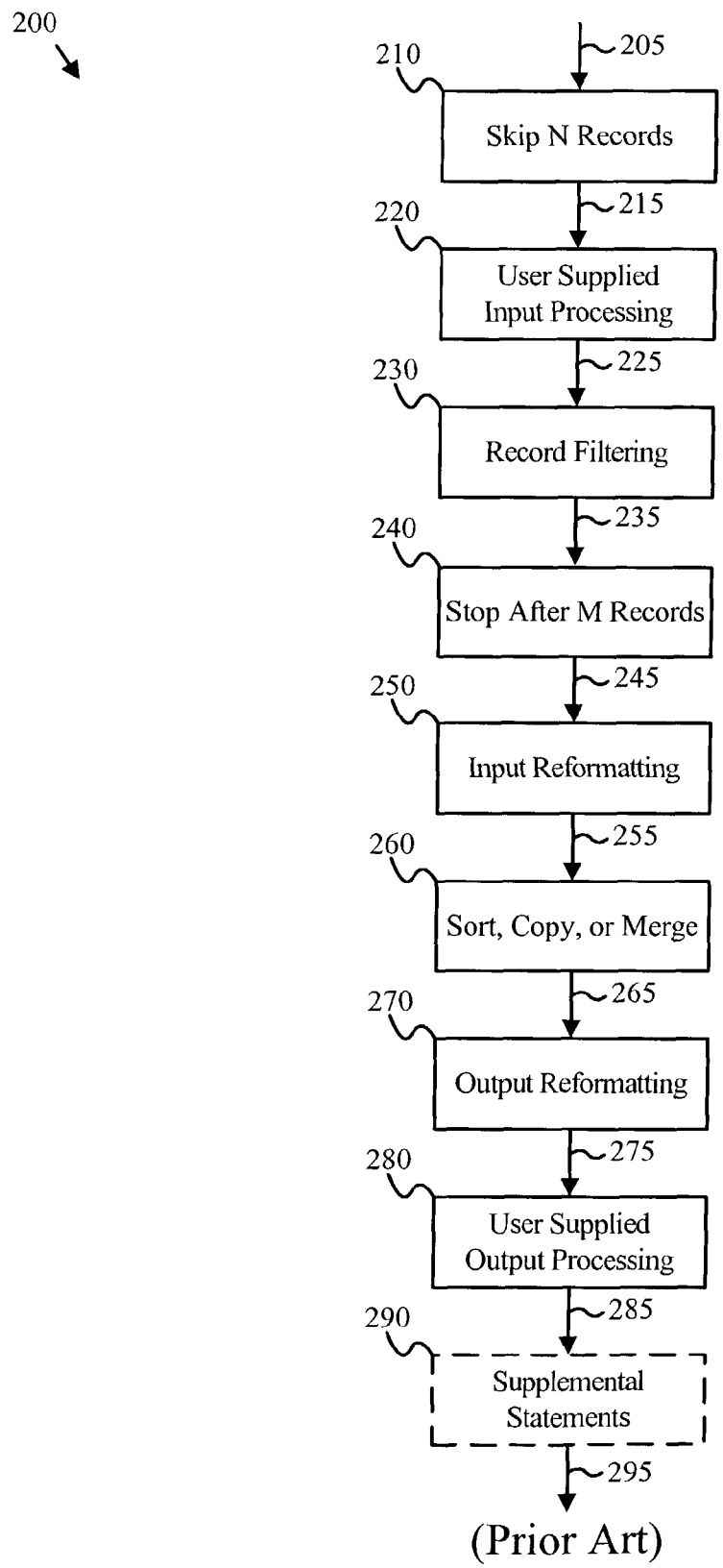
FIG. 2 is a data flow diagram illustrating one embodiment of a prior art data processing pipeline.

FIG. 2 is a data flow diagram of a prior art data pipeline 200 exemplary of the environment wherein the present invention may be deployed. The depicted diagram shows the preferred relationship of various processing stages of the data pipeline 200. The depicted data pipeline 200 of the depicted embodiment is essentially a job-configurable virtual machine that executes on a computer such as the mainframe 120 depicted in FIG. 1.

The data pipeline 200 facilitates efficient record-oriented processing such as copying, filtering, sorting, summing, formatting, and reporting on data records. Although the present invention was developed in response to the needs of the data pipeline 200 on the mainframe 120, the present invention may be deployed separately from the data pipeline 200 and the mainframe 120.

The data pipeline 200 processes data as directed by various control statements corresponding to the processing stages of the data pipeline 200. In one embodiment, multiple control statements corresponding to a set of data records are parsed and packed into one or more control blocks (not shown). The control blocks configure the various processing stages of the data pipeline 200 and facilitate execution of a scheduled job.

Typically, a set of data records 205 in the form of a file is fed one record at a time into the pipeline 200. However, each pipeline stage may process multiple records concurrently, particularly those stages that compare data from multiple records, such as the sort stage 260. Pipeline stages that are not used are preferably bypassed such that records from a previous stage are provided to a subsequent stage without processing by the bypassed stage.

As depicted, the data pipeline 200 includes a skip stage 210, a user supplied input stage 220, a filtering stage 230, a stop stage 240, a reformatting stage 250, a sort stage 260, a reformatting stage 270, a user supplied output stage 280, and one or more supplemental stages 290. Stages 210-250, and 270-290 are optional in that stages that are not referenced by control statements are bypassed within the data pipeline 200. For illustration purposes, the following description generally assumes that each stage is used within the data pipeline 200.

The skip stage 210 skips or discards a selected number of the data records 205 before passing unskipped records 215 onto the next stage of the data pipeline 200. A user supplied input stage 220 facilitates conducting user supplied processing routines on the unskipped records 215 and provides one or more data records 225. In one embodiment, the data pipeline 200 may be configured to receive data records 225 directly from the user supplied input stage 220 without use of the skip stage 210.

The filtering stage 230 filters the data records 225 such that selected records 235 are passed on to the remainder of the pipeline 200, while other records are discarded. The record filtering accomplished by the filtering stage 230 preferably occurs as directed by control statements associated with record filtering.

The stop stage 240 receives the selected records 235 from the filtering stage 230. The stop stage 240 passes a selected number of the data records 245 to the remainder of the data pipeline 200. In one embodiment, the selected number of data records 245 is indicated by a control block created from one or more control statements associated with a set of data records. After the selected number of records 245 have been supplied to the remainder of the data pipeline 200, the stop stage 240 indicates an end of data condition to the next stage in the data pipeline 200.

The reformatting stage 250 reformats data within the records 245 and passes formatted records 255 to the sort stage 260 which in turn provides sorted records 265. In addition to sort operations, the sort stage 260 may also be configured to merge or copy data records as specified by the control statements associated with the records being processed. The reformatting stage 270 applies additional formatting operations to the sorted records 265 to provide one or more formatted records 275.

The formatted records 275 are fed to the user supplied output stage 280. Upon completion of the customized processing provided by the user supplied output stage 280, one or more data records 285 are passed either to the supplemental processing stage 290, or alternately, directly to an output file 295. The supplemental processing stage 290 is configured to conduct multiple passes on the data records 285 and conduct specialized formatting and reporting operations in order to generate multiple forms of output related to the set of data records.

Figure 3:
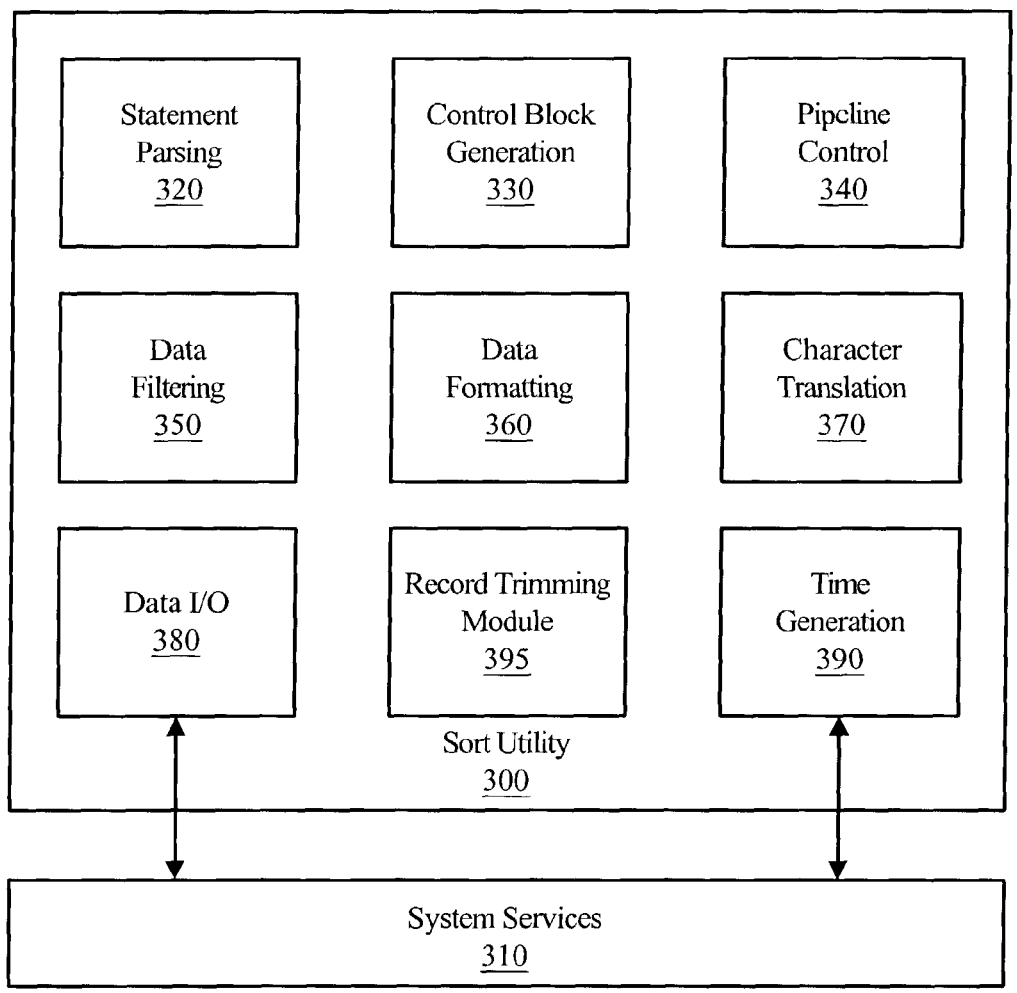
FIG. 3 is a block diagram illustrating one embodiment of a sort utility in accordance with the present invention.

FIG. 3 is a block diagram illustrating selected modules of a sort utility 300 in accordance with the present invention. The sort utility 300 provides record-oriented processing services such as sorting, merging, copying, summing, and formatting of data records. In one embodiment, the sort utility 300 is configured to provide record-oriented processing services to system utilities, operating system extensions, programming languages, applications, and the like.

In the depicted embodiment, the sort utility 300 includes a variety of modules useful for record-oriented processing. The functionality of the modules within the sort utility 300 is increased by the use of system services 310 such as those available within an operating system such as IBM®'s z/OS or OS390. The modules depicted in FIG. 3 include a statement parsing module 320, a control block generation module 330, a pipeline control module 340, a data filtering module 350, a data formatting module 360, a character translation module 370, a data I/O module 380, a time generation module 390, and a record trimming module 395.

The sort utility 300 receives a set of control statements (not shown) that in one embodiment are used to configure the data pipeline 200 depicted in FIG. 2 via one or more control blocks (not shown). The statement parsing module 320 parses the control statements to ascertain various options and parameters related to the processing stages of the data pipeline 200. The control block generation module 330 encodes the parsed options and parameters into the control blocks used to configure the data pipeline 200.

The pipeline control module 340 coordinates execution and the movement of data between the stages of the data pipeline 200. As a data record finishes a pipeline stage it is directed to a subsequent stage. The data filtering module 350 includes or omits data records for subsequent processing based on conditions specified in control statements. The data I/O module(s) 380 provide I/O services to the sort utility 300 such as retrieving records to feed the pipeline and storing records processed by the pipeline.

The data formatting module 360 provides services that facilitate formatting data fields into forms appropriate for processing and/or inclusion into data records. The time generation module 390 is closely related to the data filtering module 350 and the data formatting module 360. The time generation module 390 conducts methods that efficiently generate time constants into a plurality of formats. The character translation module 370 facilitates translating selected characters within fields and records to a desired character set. The record trimming module 395 coordinates the removal of trailing data values from data records.

Figure 4:
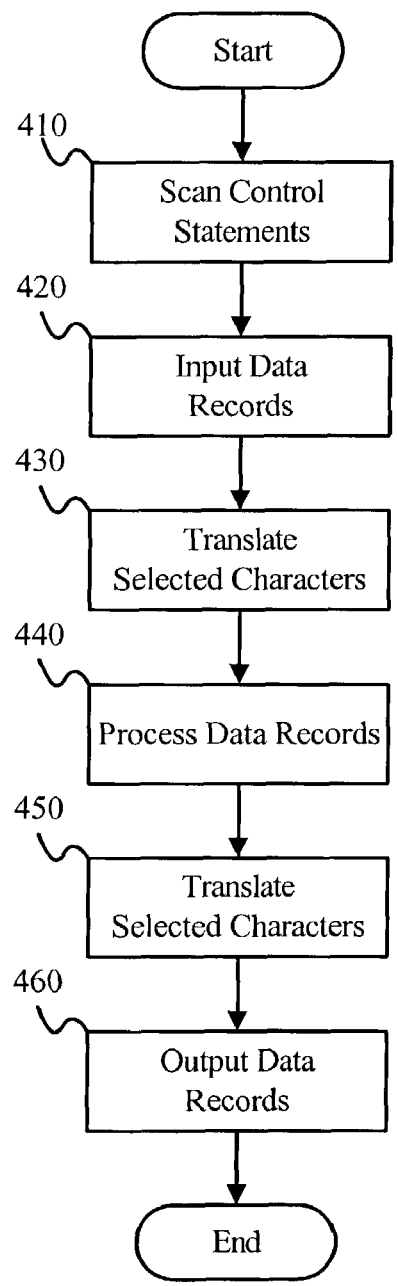
FIG. 4 is a flow chart illustrating one embodiment of a character translation method of the present invention.

FIG. 4 is a flow chart depicting one embodiment of a character translation method 400 of the present invention. The character translation method 400 may be conducted in conjunction with the statement parsing module 320, the character translation module 370, the input reformatting stage 250, the output reformatting stage 270, and the supplemental statements stage 290. The character translation method 400 facilitates efficient translation of selected characters within data records without requiring custom programming.

As depicted in FIG. 4, the character translation method 400 includes a variety of steps useful for translating selected characters. These steps include a scan control statements step 410, an input data records step 420, a translate selected characters step 430, a process data records step 440, a translate selected characters step 450, and an output data records step 460.

The scan control statements step 410 scans control statements such as those associated with a set of records to find formatting options related to character translation within control statements. In certain embodiments, the scan control statements step 410 reads all of the control statements associated with a set of records and sets up control blocks (not shown) used to direct a sort utility and associated processing pipeline. In one embodiment, the scan control statements step 410 also determines files involved with processing and prepares those files for processing.

The input data records step 420 inputs data records and prepares them for further processing. In one embodiment, the input data records step 420 reformats the data records before the data records are sent to subsequent processing stages. The data records processed by the input data records step 420 are also processed by the translate selected characters step 430. Although depicted as separate steps, the translate selected characters step 430 may be conducted simultaneously with the input data records step 420.

In certain embodiments, the characters translated by the translate selected characters step 430 are selected via formatting options specified in control statements. In one embodiment, the formatting options include options for uppercase to lowercase conversion, lowercase to uppercase conversion, and user-definable character translation as specified by a character translation table.

The process data records step 440 conducts processing operations on the data records processed by the input data records step 420 and the translate selected characters step 430. In one embodiment, the process data records step 440 includes merging, sorting or copying data records as specified by control statements associated with the job being processed.

The data records processed by step 440 are transferred to the translate selected characters step 450. Similar to the translate selected characters step 430, the characters translated by the translate selected characters step 450 may be selected via formatting options specified in control statements. In one embodiment, the translate selected characters step 430 is associated with inputting data records and the translate selected characters step 450 is associated with outputting data records.

The output data records step 460 outputs the processed data records to a file, dataset, process thread or the like. In one embodiment, the translate selected characters step 450 may be conducted in conjunction with the output data records step 460 as directed by control statements related to record reformatting. The control statements may contain formatting options that specify selected characters which are to be translated as each data record is reformatted and directed to an output file, processing thread, or the like.

Data record reformatting and character translation facilitates increased processing efficiency. Character translations such as uppercase to lowercase, lowercase to uppercase, EBCDIC to ASCII, ASCII to EBCDIC, or translations defined by a user-definable character translation table may be conducted in conjunction with record I/O and reformatting operations. Additional detail on control statements and formatting options related to character translation operations are described in conjunction with FIG. 5. Sample character translation results are described in conjunction with FIG. 6.

FIG. 5 depicts a text-based diagram illustrating one embodiment of a control statement syntax 500 given by way of example as one manner of implementing the present invention. The depicted control statement syntax 500 may be used to conduct reformatting and character translation operations in conjunction with conducting record I/O operations. The syntax 510 facilitates conducting character translation operations on selected characters without the burden of developing custom programs or exit codes.

The control statement syntax 500 includes an operation indicator 510, along with a number of formatting options and specifiers including a position indicator 520, a length indicator 530, a translation indicator 540, and a translation type specifier 550. The depicted formatting options and specifiers may be repeated within a single control statement in order to apply additional processing operations to each data record processed by the present invention.

The depicted operation indicator 510 includes an "INREC FIELDS" option corresponding to a record input stage, an "OUTREC FIELDS" option corresponding to a record output stage, and an "OUTFIL OUTREC" option corresponding to a supplemental output stage. A control statement containing the "FIELDS" keyword or the "OUTREC" keyword indicates that the control statement is use operations. Record reformatting operations require that each field be explicitly referenced to be included for subsequent processing stages.

As depicted, the position indicator 520 indicates the starting position of a field (i.e. the starting position of a string of selected characters). The optional length indicator 530 is used to specify how many characters, beginning at the indicated position, are to be included within the reformatted record. If the optional length indicator is not included within the control statement, all characters from the indicated position to the end of the record are included in the reformatted record.

The translation indicator 540 indicates that character translation is to be conducted on the selected characters. The translation type specifier 550 is used to specify the type of character translation that is to be conducted on the selected characters. In the depicted embodiment, the translation type specifier 550 includes the keyword "LTOU" when conducting lowercase to uppercase conversions, the keyword "UTOL" when conducting uppercase to lowercase conversions, and the keyword "ALTSEQ" when conducting user-defined character translations. In addition to the depicted conversions, other character translations such as ASCII to EBCDIC and EBCDIC to ASCII may be implemented with the present invention.

FIG. 5 also depicts one embodiment of a control statement syntax 560. The control statement syntax 560 facilitates modifying a character translation table in order to conduct user-defined character translation. As depicted, the syntax 560 includes a table modification indicator 562, a translation code indicator 564, an input value 566, and an output value 568.

The table modification indicator 562 and the translation code indicator 564 are used to indicate that one or more mapping pairs follow within the control statement. For each mapping pair an input value 566 (shown as an input value placeholder 'FF') and an output value 568 (shown as an output value placeholder 'TT') are specified. In the depicted embodiment of the control statement syntax 560, mapping pairs are enclosed in parenthesis and separated by a commas.

FIG. 6 is a text-based diagram illustrating several examples of data records processed by the character translation method 400 in conjunction with one example of the control statement syntax 500. In the depicted examples, an input file 610 containing several data records 615 is processed as directed by a control statement 620 conforming to the control statement syntax 500 to produce an output file 630 containing processed records 635. The depicted control statement 620 indicates that selected characters within the records being processed are to be reformatted to form new records that are passed to a subsequent processing stage such as a sort stage. In conjunction with reformatting operations, character translation operations are also conducted on some of the selected characters.

Specifically, the depicted operation indicator 510 includes the keywords "INREC FIELDS" indicating that the fields specified by the field specifiers 622,624, 626, and 628 are to be selected from the input records 615 and concatenated to form the reformatted records 635. In the depicted example, the reformatted records 635 comprising an initial login password 632 and login name with first name 636 and last name 638 are created from a first name 612, a last name 614, and a zip code 616 within the input records 615. In the depicted example, the reformatted records 635 are also sorted in password order via a sorting control statement (not shown).

As depicted, the specified fields create the password 632 by including 3 initial characters starting at position 11 of the input records 615 as specified by the field indicator 622, and 3 subsequent characters starting at position 23 as specified by the field indicator 624. In the depicted example, the 3 initial characters are selected from the last name field 614 and the 3 subsequent characters are selected from the zip code 616. The selected fields specified within the control statement 620 also include a delimiter 626, and 20 characters starting at position 1 of the input records as specified by the field indicator 628. The field indicator 628 essentially includes the first name 612 and the last name 614 within the reformatted records as the first name 636 and the last name 638. The field indicator 626 is used to place a blank delimiter 634 within the reformatted records 635.

In the depicted control statement 620, the field indicators 622 and 628 include a translation indicator 540 indicating that character translation is to be conducted on the selected characters and a translation type specifier 550. In the depicted example, translation type specifier 550 within the field indicator 622 specifies that uppercase to lowercase character translation is to be conducted on the first 3 characters of the last name 614. The translation type specifier 550 within the field indicator 628 specifies that lowercase to uppercase character translation is to be conducted on the characters within the first name 612 and the last name 614. The results of the specified character translation operations are shown within the processed records 635.

The present invention increases the utility and performance of record-oriented processing when performing character translation. In particular, a supplementary program or exit code need not be created in order to conduct character translation operations. The present invention enables character translation of selected characters within data records while conducting other operations such as records sorting, copying or merging.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for processing data records within a record sorting system, the method comprising:
   processing a plurality of data records in a data pipeline comprising concurrently executing stages;
   inputting the plurality of data records;
   at one stage of the data pipeline:
      scanning control statements associated with a data record, the control statements including translation indicators and translation type specifiers,
         wherein the translation indicators indicate that character translation is to be conducted on selected characters within a data field of the data record associated with the control statements,
         wherein the translation type specifiers specify a type of character translation to be conducted on the selected characters, where multiple types of character translation are supported;
      translating the selected characters from the data field of the data record as specified by the translation indicators and the translation type specifiers in the control statements;
   at another stage of the data pipeline, sorting a second record with respect to the plurality of data records; and
   outputting the plurality of data records to another stage of the data pipeline.

2. The method of claim 1, wherein sorting is executed by DFSORT® on a mainframe and the control statement is a programmatic command to DFSORT®.

3. The method of claim 1, wherein the control statement is selected from the group consisting of input control statements, output control statements, and supplemental control statements.

4. The method of claim 1, wherein translating the selected characters occurs in conjunction with inputting the plurality of data records.

5. The method of claim 1, wherein translating the selected characters occurs in conjunction with outputting the plurality of data records.

6. The method of claim 1, wherein translating the selected characters comprises an operation selected from the group consisting of lowercase-to-uppercase conversion, uppercase-to-lowercase conversion, EBCDIC-to-ASCII conversion, ASCII-to-EBCDIC conversion, and user-definable character translation.

7. The method of claim 1, wherein the translating selected characters is conducted using a character translation table.

8. A system comprising a processor and memory for translating and sorting data records, the system comprising:
   a sort utility configured to:
      concurrently process a plurality of data records at two or more stages of a data pipeline;
      to input the plurality of data records;
      to scan control statements associated with the plurality of data records, the control statements including translation indicators and translation type specifiers,
         wherein the translation indicators indicate that character translation is to be conducted on selected characters within a data field of the data record associated with the control statements,
         wherein the translation type specifiers specify a type of character translation to be conducted on the selected characters,
      where multiple types of character translation are supported;
      to translate the selected characters of the data field of the data record as specified by the translation indicators and the translation type specifers;
      to sort the plurality of data records; and
      to output the plurality of data records to another stage of the data pipeline.

9. The system of claim 8, wherein the sort utility is further configured to copy the plurality of data records.

10. The system of claim 8, wherein the sort utility is further configured to merge the plurality of data records.

11. The system of claim 8, wherein character translation comprises an operation selected from the group consisting of lowercase-to-uppercase conversion, uppercase-to-lowercase conversion, EBCDIC-to-ASCII conversion, ASCII-to-EBCDIC conversion, and user-definable character translation.

12. The system of claim 8, wherein the sort utility is configured to conduct character translation in conjunction with inputting the plurality of data records.

13. The system of claim 8, wherein the sort utility is configured to conduct character translation in conjunction with outputting the plurality of data records.

14. An apparatus for processing data records within a record translating and sorting system, the apparatus comprising:
   a data I/O module configured to input a plurality of data records;
   a character translation module configured to:
      scan control statements associated with a data record, the control statements including translation indicators and translation type specifiers,
         wherein the translation indicators indicate that character translation is to be conducted on selected characters within a data field of the data record associated with the control statements,
         wherein the translation type specifiers specify a type of character translation to be conducted on the selected characters, where multiple types of character translation are supported;
      translate the selected characters of the data field of the data record within the plurality of data records at one stage of a data pipeline as specified by the translation indicators and the translation type specifiers in the control statements;
   a sort utility configured to sort the data records at a distinct stage of the data pipeline and the data I/O module further configured to output a plurality of data records,
   wherein the data I/O module and the character translation module operate on successive stages of a data pipeline;
   wherein the apparatus comprises at least one of hardware and a non-transitory computer readable storage medium.

15. The apparatus of claim 14, further comprising a sorting module configured to sort the plurality of data records.

16. The apparatus of claim 14 further comprising a parser configured to scan the control statement and find the at least one formatting option, the at least one formatting option being relating to character translation.

17. An apparatus for processing data records within a record sorting system, the apparatus comprising:
   means for inputting a plurality of data records;
   means for translating selected characters within a data field of the plurality of data records as specified by at least one formatting option within a control statement; and
   means for sorting the plurality of data records in a data pipeline;
   means for scanning control statements associated with a data record, the control statements including translation indicators and translation type specifiers,
      wherein the translation indicators indicate that character translation is to be conducted on selected characters within a data field of the data record associated with the control statements, and
      wherein the translation type specifiers specify a type of character translation to be conducted on the selected characters, where multiple types of character translation are supported;
   means for translating the selected characters from the data field of the data record as specified by the translation indicators and the translation type specifiers in the control statements;
   means for outputting the plurality of data records to another stage of the data pipeline, wherein sorting and translating is executed concurrently on distinct records at distinct stages of a data pipeline; and
   wherein the apparatus comprises at least one of hardware and a non-transitory computer readable storage medium.

18. The apparatus of claim 16, wherein the means for sorting the plurality of data records utilizes DFSORT® on a mainframe.

19. The apparatus of claim 16, further comprising means to find the at least one formatting option, the at least one formatting option being related to character translation within the control statements.

20. A non-transitory computer readable storage medium comprising computer readable program code for processing data records within a record sorting system, the program code configured to:
   input a plurality of data records;
   scan control statements associated with a data record, the control statements including translation indicators and translation type specifiers,
      wherein the translation indicators indicate that character translation is to be conducted on selected characters within a data field of the data record associated with the control statements,
      wherein the translation type specifiers specify a type of character translation to be conducted on the selected characters, where multiple types of character translation are supported;
   translate the selected characters within the data field of the plurality of data records at one stage of a data pipeline as specified by the translation indicators and the translation type specifiers in the control statements;
   sort the data records at one stage of the data pipeline as specified by at least one formatting option within a control statement; and
   output the plurality of data records to another stage of the data pipeline.

21. The computer readable storage medium of claim 18, wherein the program code is configured to translate selected characters in conjunction with inputting the plurality of data records.

22. The computer readable storage medium of claim 18, wherein the program code is configured to translate selected characters in conjunction with outputting the plurality of data records.

23. The computer readable storage medium of claim 18, wherein sorting the data records comprises executing a DFSORT® utility on a mainframe.

24. The computer readable storage medium of claim 18, wherein the program code is further configured to scan the control statement to find the at least one formatting option related to character translation.

* * * * *